United States Patent Office 2,962,416
Patented Nov. 29, 1960

2,962,416

STABILIZING AGENTS FOR BORDEAUX MIXTURE

Wilbur S. Taylor, Norwalk, Conn., assignor to R. T. Vanderbilt Company, Inc., New York, N.Y., a corporation of New York No Drawing. Filed Nov. 18, 1957, Ser. No. 696,959

5 Claims. (Cl. 167—16)

This invention is concerned with certain novel stabilizers for Bordeaux mixture. In particular, it is concerned with the stabilization of Bordeaux mixture by means of certain polyhydroxyl compounds which can be derived from wood or from molasses.

Bordeaux mixture is one of the most widely used fungicides for the control of plant diseases. It is a water suspension of a solid hydrogel complex prepared by adding a solution of copper sulfate to a slurry of hydrated lime. One disadvantage of Bordeaux mixture is its instability, for it does not long retain the hydrogel form necessary to obtain the good suspension required for spreading on and adhering to the foliage being treated. Unstabilized Bordeaux mixture, to be effective, must be made up very shortly before use. This is particularly true in tropical climates where temperatures of 110° F. are frequently encountered. Such high temperature tends to cause precipitation of the Bordeaux mixture. There are materials known to the prior art which are useful for the stabilization of Bordeaux mixture. None of these, however, is as effective as those of the present invention, particularly at temperatures as high as 110° F.

In preparing the Bordeaux mixture, it is customary to prepare a solution of copper sulfate pentahydrate and a slurry of hydrated lime, and then mix the two in proportions which will produce Bordeaux mixture having the desired total solids content and the desired ratio of copper salt to lime. The most widely used Bordeaux mixtures are believed to be those in which the weight ratio is one part of copper sulfate pentahydrate to one part of hydrated lime, and 4 parts of copper sulfate pentahydrate to 3 parts of hydrated lime, although other ratios such as 2 to 1, and 7 to 10 are also used. It is customary to express the concentration of Bordeaux mixture in terms of 3 figures, the first representing the pounds of copper sulfate, the second the pounds of hydrated lime, and the third the gallons of water. Thus, a typical Bordeaux mixture would be 5–3.75–50. In ordinary Bordeaux mixture the concentration of solids is less than 5%.

The polyhydroxyl compounds useful in the practice of this invention are those derivable from wood and those derivable from molasses. Xylose and mannose are derivable from wood. In fact, wood sugar is another name for xylose. In this specification, the term wood sugars is intended to include the commercial product containing largely xylose and some mannose with small amounts of other sugars. Sucrose, sorbitol, mannitol, and invert sugar are derivable from molasses. It is indeed surprising that these particular compounds have a stabilizing effect upon Bordeaux mixture in view of the fact that the closely related substances glucose and glycerol are not effective for this purpose. It is particularly surprising that invert sugar, which is 50% glucose, should be effective, since glucose itself is not.

Co-pending application Serial No. 674,277, filed July 26, 1957, by Charles H. Rogers, discloses a method of preparing concentrated Bordeaux mixtures by the filtration or centrifugation of ordinary Bordeaux mixture. Concentrated Bordeaux mixtures containing more than 6% and up to as high as 33% solids are thereby obtained. The stability of these Bordeaux mixture concentrates is also improved, particularly at high temperatures, by the use of the stabilizing agents of the present invention.

To stabilize ordinary, i.e. unconcentrated, Bordeaux mixture, the polyhydroxylated compounds of the present invention are used in a range of from 0.5% to 6% by weight based on solids in the Bordeaux mixture. When used to stabilize the concentrated Bordeaux mixture of co-pending application Serial No. 674,277, the polyhydroxylated compounds of the present invention are used in a range from 1.5% to 5% by weight based on the solids present in the Bordeaux mixture.

The compounds derivable from wood exert a stabilizing influence on the Bordeaux mixture when used alone, and so do the compounds derivable from molasses. It is, however, preferable in order to obtain best results that a mixture of both types be employed. The compounds from wood and those from molasses, either alone or in combination with each other, are also particularly useful when mixed with calcium lignosulfonate. The ratio of the polyhydroxylated compounds to the calcium lignosulfonate should be in the range of from 1 to 4 to 4 to 1 by weight.

Co-pending application Serial No. 569,302, filed March 5, 1956, by Charles H. Rogers, discloses the use of mixtures of calcium lignosulfonate with partially esterified mixtures of certain aliphatic monocarboxylic acids and certain polyhydric alcohols for the stabilization of suspended materials such as Bordeaux mixture. The polyhydroxylated compounds of the present invention are also useful in combination with the partially esterified mixtures of that application, giving much better results than those obtained by either alone.

A particularly useful substance for the practice of the present invention is the material known by the trade name "Bindarene." Bindarene is commercially available from the International Paper Company. It is obtained from the manufacture of wood pulp. Bindarene flour contains 70% calcium lignosulfonate, 20% wood sugars (largely xylose) and 10% inert inorganic material. Bindarene liquid is a 50% aqueous solution of Bindarene flour. A mixture of 3 parts by weight of Bindarene flour and 2 parts by weight of blackstrap molasses is an example of a readily prepared and economical composition of the present invention which gives extremely good results in the stabilization of both ordinary and concentrated Bordeaux mixture. Such a mixture of Bindarene and molasses contains wood sugars, sugar from molasses, and calcium lignosulfonate, and, as mentioned above, the combination of these three ingredients is particularly good. A mixture of 2 parts by weight of molasses and 3 parts by weight Bindarene flour comprises 40% molasses, 12% wood sugars and 42% calcium lignosulfonate, the remaining parts being inert inorganic materials contained in Bindarene. Another preferred embodiment of the present invention is a mixture of equal parts by weight of molasses and Bindarene flour. Such a mixture comprises 50% molasses, 10% wood sugars and 35% calcium lignosulfonate. Compositions of matter comprising molasses, wood sugars and calcium lignosulfonate in the proportions of from 30 to 50%, from 3 to 20% and from 35 to 50% respectively are preferred embodiments of the present invention.

The following examples are given solely for purposes of illustration and are not to be considered as limiting the invention to these embodiments. Many modifications will be apparent to those skilled in the art without departing from the spirit or scope of the invention.

Example 1

To 100 gallons of a Bordeaux mixture containing 5 pounds of copper sulfate pentahydrate and 3.75 pounds of calcium hydroxide per 50 gallons of water, 6 ounces of Bindarene flour was added. After storage at 110° F. for 62 days the mixture had not appreciably settled and was still usable.

Example 2

To 100 gallons of a 5–3.75–50 Bordeaux mixture 3 ounces of a 70% sorbitol 30% water mixture and 3 ounces of VANAJ #3 were added. The mixture survived storage at 110° F. for 105 days without failure. VANAJ #3 is a mixture of 64.66% calcium lignosulfonate, 31.0% Triton X-114 (an alkyl aryl polyether alcohol) and 4.34% partial diester of alpha methyl d-glucoside and palmitic acid.

Example 3

To 100 galolns of a 5–3.75–50 Bordeaux mixture, mixtures of 100% sorbitol and VANAJ #3 in the following amounts were added: 1 ounce sorbitol and 5 ounces VANAJ #3; 1.2 ounces sorbital and 4.8 ounces of VANAJ #3; 3 ounces sorbital and 3 ounces of VANAJ #3; 4 ounces of sorbitol and 2 ounces of VANAJ #3. Each of these mixtures survived 102 days of storage at 110° F. without failure.

Example 4

To 100 gallons of 5–3.75–50 Bordeaux mixture, molasses and VANAJ #3 were added in the following amounts: 3 ounces of molasses and 3 ounces VANAJ #3; 4 ounces molasses and 2 ounces VANAJ #3. Each of these solutions survived storage at 110° F. for over 100 days without failure.

Example 5

To 100 gallons of a 5–3.75–50 Bordeaux mixture, 9 ounces of Bindarene liquid was added. The mixture survived storage at 110° F. for 19 days without failure.

Example 6

To 100 gallons of 5–3.75–50 Bordeaux mixture, 2.4 ounces calcium lignosulfonate, 2.0 ounces molasses sugar and 6.6 ounces of wood sugar were added. The mixture survived storage at 110° F. for 31 days. When this experiment was repeated using 3 ounces of molasses, the mixture survived for 35 days.

Example 7

A three liter batch of 10–10–100 Bordeaux mixture was prepared by slurrying 36 grams of hydrated lime in 600 ml. of water, and slowly adding with agitation 2400 ml. of copper sulfate solution containing 36 grams of copper sulfate pentahydrate. 20 minutes was required to add all of the sulfate solution to the slurry, thereby bringing about the reaction between the copper sulfate and the lime to produce a typical blue hydrogel. The Bordeaux mixture was blended through a super centrifuge equipped with a clarifier bowl, operating at 18,000 r.p.m. The rate of feed was 1250 ml. per minute so the separation required about 2½ minutes for the three liter batch. A concentrated hydrogel of 428 ml. volume was thus separated from a relatively clear water effluent of 2572 ml. The hydrogel was thereby concentrated to 7 times its concentration in the dilute Bordeaux mixture. To the 428 ml. of concentrate, there was added 1.51 grams of calcium lignosulfonate and 0.43 grams of a blend of wood sugars, while stirring the concentrate sufficiently to produce good dispersion. The stabilized concentrate was stored for one month at room temperautre with no visible change in appearance. At the end of this time, a 71.4 ml. sample was diluted with 428.6 ml. of water and agitated until the mixture was homogeneous. Upon testing the reconstituted concentrate, having a composition of 10–10–100, was found to have the properties of freshly prepared 10–10–100 Bordeaux mixture. The concentrate was stored for an additional two week period, at the end of which time a sample was diluted to the 10–10–100 composition and found to have the same satisfactory properties.

Example 8

A 10–10–100 Bordeaux mixture was prepared by the procedure described in Example 7 and was concentrated by filtration removing 2572 ml. of clear filtrate water from the three liter batch. Filtration was accomplished in a filter flask using a Buchner funnel with analytical filter paper (#576) under 30 pounds vacuum. Approximately three-quarters of an hour was required. The concentrate was stabilized with the combination of calcium lignosulfonate and wood sugars described in Example 7. Upon storage for one month and for six weeks, samples of concentrate when reconstituted with water gave satisfactory results.

Example 9

A three liter batch of 10–10–100 Bordeaux mixture was prepared and concentrated by the procedure described in Example 7. To the 428 ml. of concentrate there was added 1.44 grams of blackstrap molasses, common commercial form, while stirring the concentrate sufficiently to produce good dispersion. The stabilized concentrate was stored for one month at room temperature, with no visible change in appearance. At the end of this time, a 71.4 ml. sample was diluted with 428.6 ml. of water with agitation until the mixture was homogeneous. Upon testing, the reconstituted concentrate (having a composition of 10–10–100) was found to have the properties of freshly prepared 10–10–100 Bordeaux mixture.

Example 10

A three liter batch of 10–10–100 Bordeaux mixture was prepared and concentrated by the procedure described in Example 8. The concentrate was stabilized in exactly the same manner as in Example 9. Upon storing for one month and reconstituting as in Example 9, the resulting product gave the excellent properties of freshly prepared Bordeaux mixture.

Example 11

A three liter batch of 10–10–100 Bordeaux mixture was prepared and concentrated by the procedure described in Example 7. To the 428 ml. of concentrate there was added 1.08 grams of molasses, 0.756 gram of calcium lignosulfonate and 0.216 gram of wood sugars, while stirring the concentrate sufficiently well to produce good dispersion. The stabilized concentrate was stored for two months, reconstituted and tested. It was found to have the properties of freshly prepared Bordeaux mixture 10–10–100.

Example 12

A three liter batch of 10–10–100 Bordeaux mixture was prepared and concentrated by the procedure described in Example 8. To the concentrate there was added the same proportions of molasses, calcium lignosulfonate and wood sugars as described in Example 11, with like stirring. Following equal storage (two months) this concentrate was found to perform equally well and in all respects resembled the concentrate of Example 11.

Example 13

The following table shows the number of days required before failure upon storage at 110° F. after the following materials were added to 100 gallon samples of 5-3.75-50 Bordeaux mixture.

| Material added (ounces) | | | Days before failure |
|---|---|---|---|
| Calcium ligno-sulfonate | Molasses | Wood Sugar | |
| 2 | 4 | 0 | 24 |
| 3 | 4 | 0 | 27 |
| 1.6 | 2 | 0.4 | 30 |
| 2.4 | 2 | 0.6 | 28 |
| 1.6 | 3 | 0.4 | 22 |
| 2.4 | 3 | 0.6 | 32 |
| 0.8 | 4 | 0.2 | 25 |
| 1.6 | 4 | 0.4 | 25 |
| 2.4 | 4 | 0.6 | 52 |

What is claimed is:

1. Bordeaux mixture containing a stabilizer selected from the group consisting of xylose, mannose, mannitol, sucrose, sorbitol, and invert sugar, in an amount from 0.5 to 6% by weight based on the solids content of the Bordeaux mixture.

2. A composition as claimed in claim 1 in which the stabilizer comprises xylose.

3. A stabilized Bordeaux mixture comprising (1) from 0.5 to 6% by weight, based on the solids content of the Bordeaux mixture, of a polyhydroxyl stabilizer selected from the group consisting of mannose, xylose, mannitol, sucrose, sorbitol, and invert sugar, and (2) calcium lignosulfonate in a proportion from 1 to 4 to 4 to 1 based on the weight of the polyhydroxyl stabilizer.

4. A composition of matter which will stabilize Bordeaux mixture when added thereto in an amount from 0.5% to 6% by weight based on the solids content of the Bordeaux mixture, said composition comprising molasses, wood sugars and calcium lignosulfonate in the proportions of from 30 to 50%, from 3 to 20%, and from 35 to 50% respectively.

5. A Bordeaux mixture containing more than 6% solids by weight, and stabilized by a stabilizer selected from the group consisting of xylose, mannose, mannitol, sucrose, sorbitol, and invert sugar, the stabilizer being present in an amount from 1.5 to 5% by weight based on the solids content of the Bordeaux mixture.

References Cited in the file of this patent
UNITED STATES PATENTS 2,551,446 Marks _____ May 1, 1951
2,760,900 Glenn _____ Aug. 28, 1956

OTHER REFERENCES

Schneiderhan: Preparation and Properties of Bordeaux Mixtures, June 1937, page 24.

The U.S. Dispensatory, 25th ed., 1955, pp. 1345 and 1346.